US012431978B2

United States Patent
Uno

(10) Patent No.: US 12,431,978 B2
(45) Date of Patent: Sep. 30, 2025

(54) WIRELESS SYSTEM

(71) Applicant: SONY SEMICONDUCTOR SOLUTIONS CORPORATION, Kanagawa (JP)

(72) Inventor: Masahiro Uno, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 232 days.

(21) Appl. No.: 18/264,638

(22) PCT Filed: Jan. 13, 2022

(86) PCT No.: PCT/JP2022/000910
§ 371 (c)(1),
(2) Date: Aug. 8, 2023

(87) PCT Pub. No.: WO2022/176452
PCT Pub. Date: Aug. 25, 2022

(65) Prior Publication Data
US 2024/0113785 A1    Apr. 4, 2024

(30) Foreign Application Priority Data

Feb. 19, 2021   (JP) ................................. 2021-025442

(51) Int. Cl.
*H04B 10/2575*   (2013.01)
*G06V 20/50*   (2022.01)
(Continued)

(52) U.S. Cl.
CPC ....... *H04B 10/25752* (2013.01); *G06V 20/50* (2022.01); *G06V 40/20* (2022.01); *H04W 16/28* (2013.01); *H04W 28/06* (2013.01)

(58) Field of Classification Search
None
See application file for complete search history.

(56) References Cited

U.S. PATENT DOCUMENTS 7,769,221 B1 *   8/2010  Shakes ................. G06Q 10/087
                                                          705/28
8,929,604 B2 *   1/2015  Platonov ............ G01C 21/3602
                                                          701/28
(Continued)

FOREIGN PATENT DOCUMENTS

JP    2013-172377 A    9/2013
JP    2019-075814 A    5/2019
(Continued)

OTHER PUBLICATIONS

International Search Report and Written Opinion of PCT Application No. PCT/JP2022/000910, issued on Feb. 15, 2022, 08 pages of ISRWO.

(Continued)

*Primary Examiner* — Jai M Lee
(74) *Attorney, Agent, or Firm* — CHIP LAW GROUP

(57) ABSTRACT

A wireless system according to an embodiment of the present disclosure includes: one or a plurality of distributed units each including an antenna, a wireless circuit, and a camera, the wireless circuit transmitting and receiving a wireless signal via the antenna, the camera outputting an image signal; and a central unit that is line-coupled to each of the distributed units. The each of the distributed units transmits the wireless signal from the wireless circuit and image information based on the image signal outputted from the camera to the central unit using one line. The central unit includes a radio resource control circuit, a baseband circuit that performs signal processing on the wireless signal from the each of the distributed units on a basis of control performed by the radio resource control circuit, and a processing circuit that performs a process based on the image information from the each of the distributed units.

11 Claims, 9 Drawing Sheets

(51) Int. Cl.
*G06V 40/20* (2022.01)
*H04W 16/28* (2009.01)
*H04W 28/06* (2009.01)

(56) References Cited

U.S. PATENT DOCUMENTS

| | | | | |
|---|---|---|---|---|
| 10,153,841 | B2* | 12/2018 | Palanisamy | H04W 24/02 |
| 10,169,677 | B1* | 1/2019 | Ren | G06V 20/52 |
| 10,205,514 | B2* | 2/2019 | Takahashi | H04N 7/181 |
| 10,651,956 | B2* | 5/2020 | Hisch | H04N 1/2125 |
| 10,915,796 | B2* | 2/2021 | Yang | G06V 20/10 |
| 11,323,146 | B2* | 5/2022 | Na | H04B 1/0483 |
| 11,629,937 | B2* | 4/2023 | Guo | F41G 3/14 |
| | | | | 89/1.11 |
| 11,714,485 | B2* | 8/2023 | Uhm | G01S 7/006 |
| | | | | 348/135 |
| 11,809,183 | B2* | 11/2023 | Yang | H04W 4/40 |
| 12,273,660 | B2* | 4/2025 | Carey | H04N 5/265 |
| 2010/0318566 | A1* | 12/2010 | Yoshio | G08B 13/19671 |
| | | | | 707/774 |
| 2012/0127314 | A1* | 5/2012 | Clements | G08B 13/246 |
| | | | | 235/375 |
| 2012/0154508 | A1* | 6/2012 | Himeno | H04M 1/72439 |
| | | | | 348/14.02 |
| 2015/0054639 | A1* | 2/2015 | Rosen | H04W 4/80 |
| | | | | 340/439 |
| 2023/0300445 | A1* | 9/2023 | Kobori | H04N 23/661 |
| | | | | 348/207.99 |

FOREIGN PATENT DOCUMENTS

| | | |
|---|---|---|
| JP | 2020-520176 A | 7/2020 |
| JP | 2020-167519 A | 10/2020 |

OTHER PUBLICATIONS

Umesh et al., "5G Radio Access Network Standardization Trends", NTT DOCOMO Technical Journal vol. 25 No. 3, Oct. 2017.

* cited by examiner

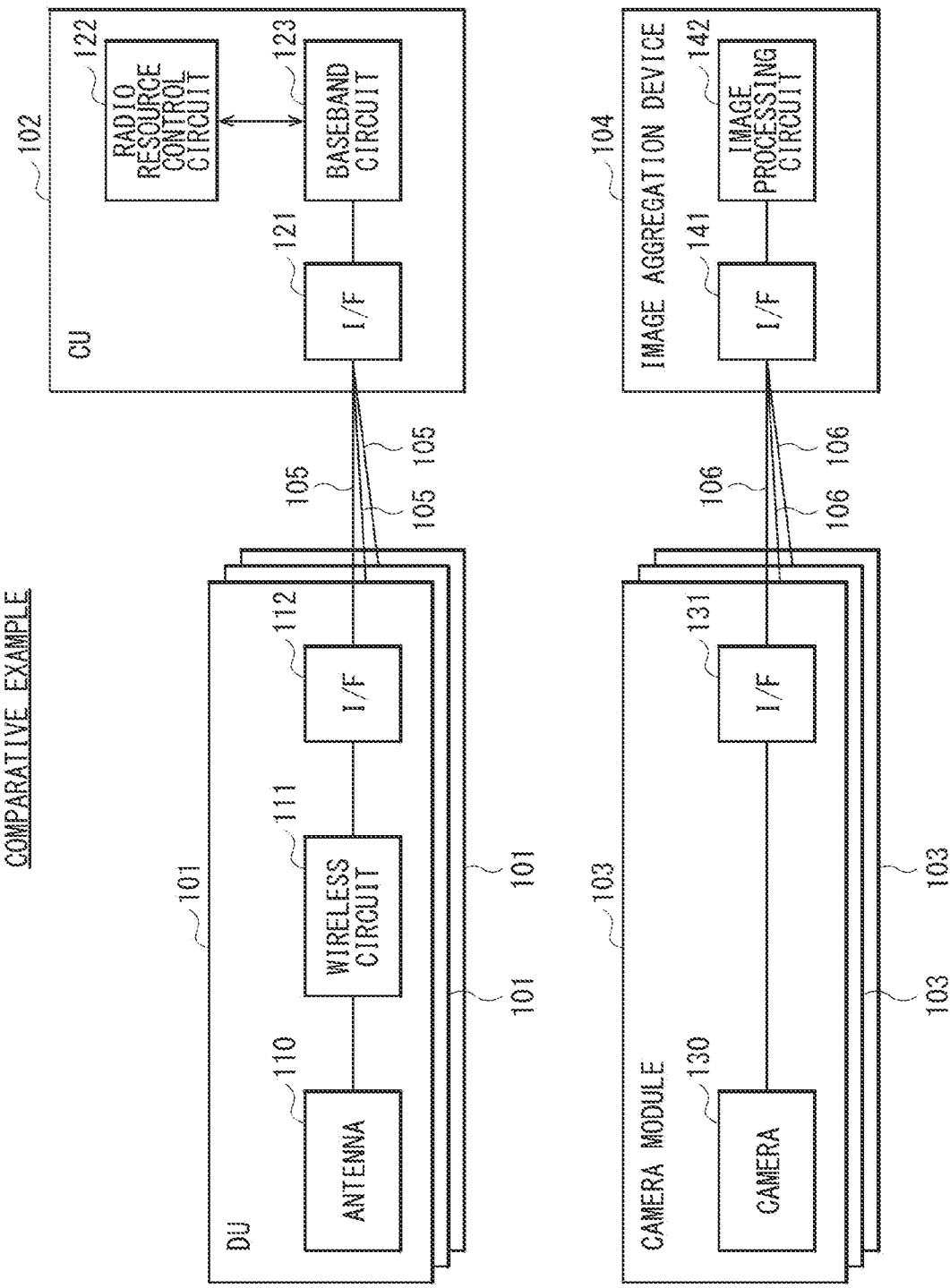

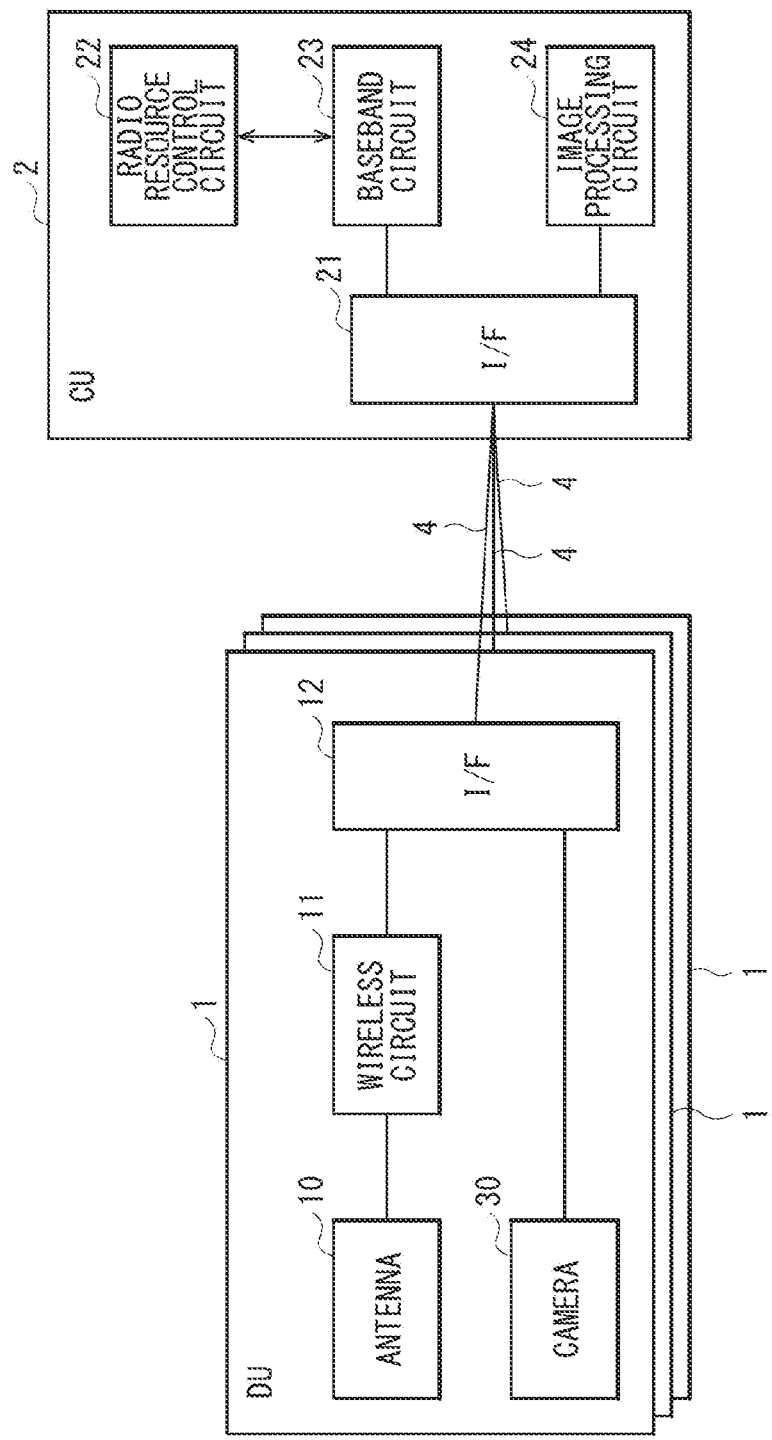
[FIG. 2]

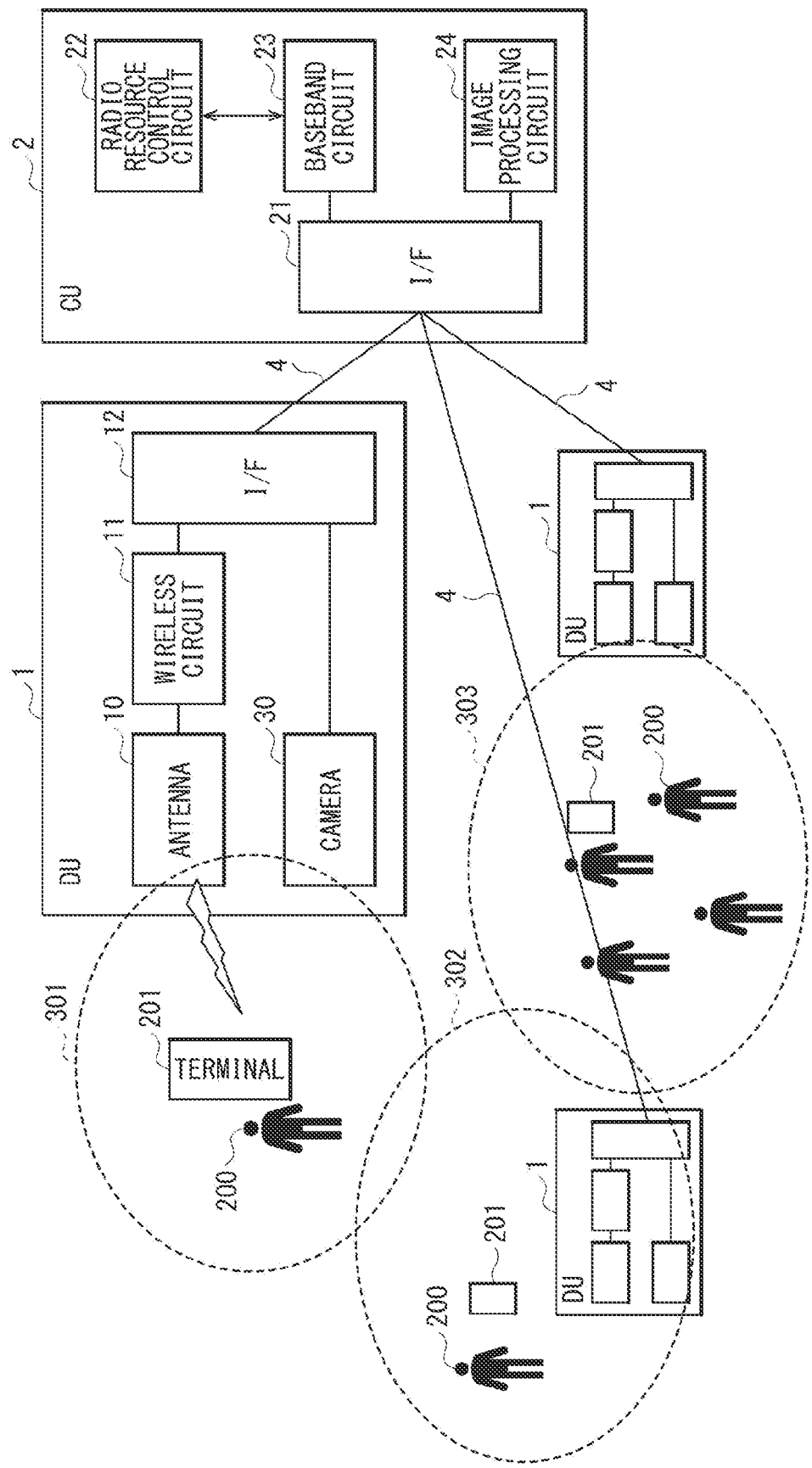
[FIG. 3]

[FIG. 4]
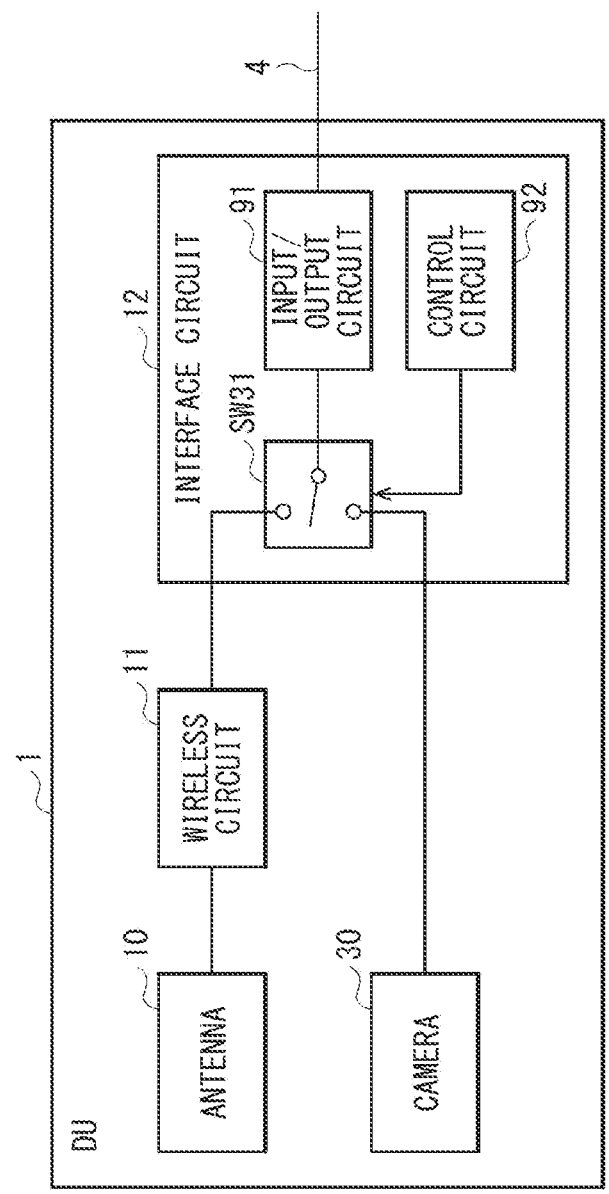

[FIG. 5A] WIRELESS SIGNAL
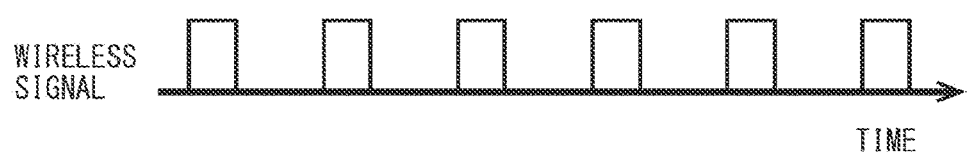
[FIG. 5B] IMAGE SIGNAL
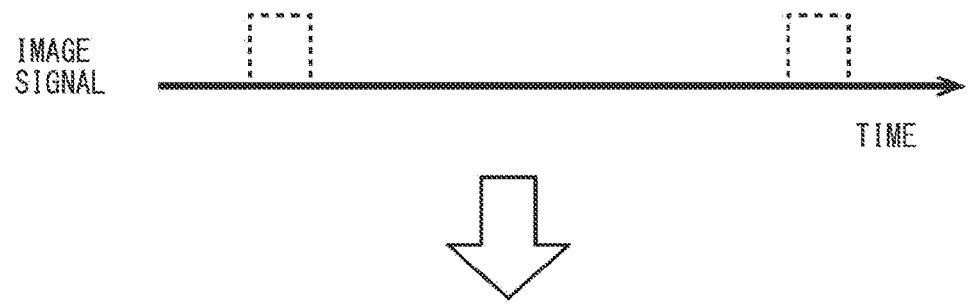
[FIG. 5C] SIGNALS ON LINE
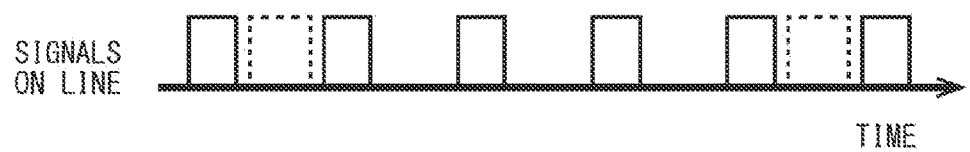

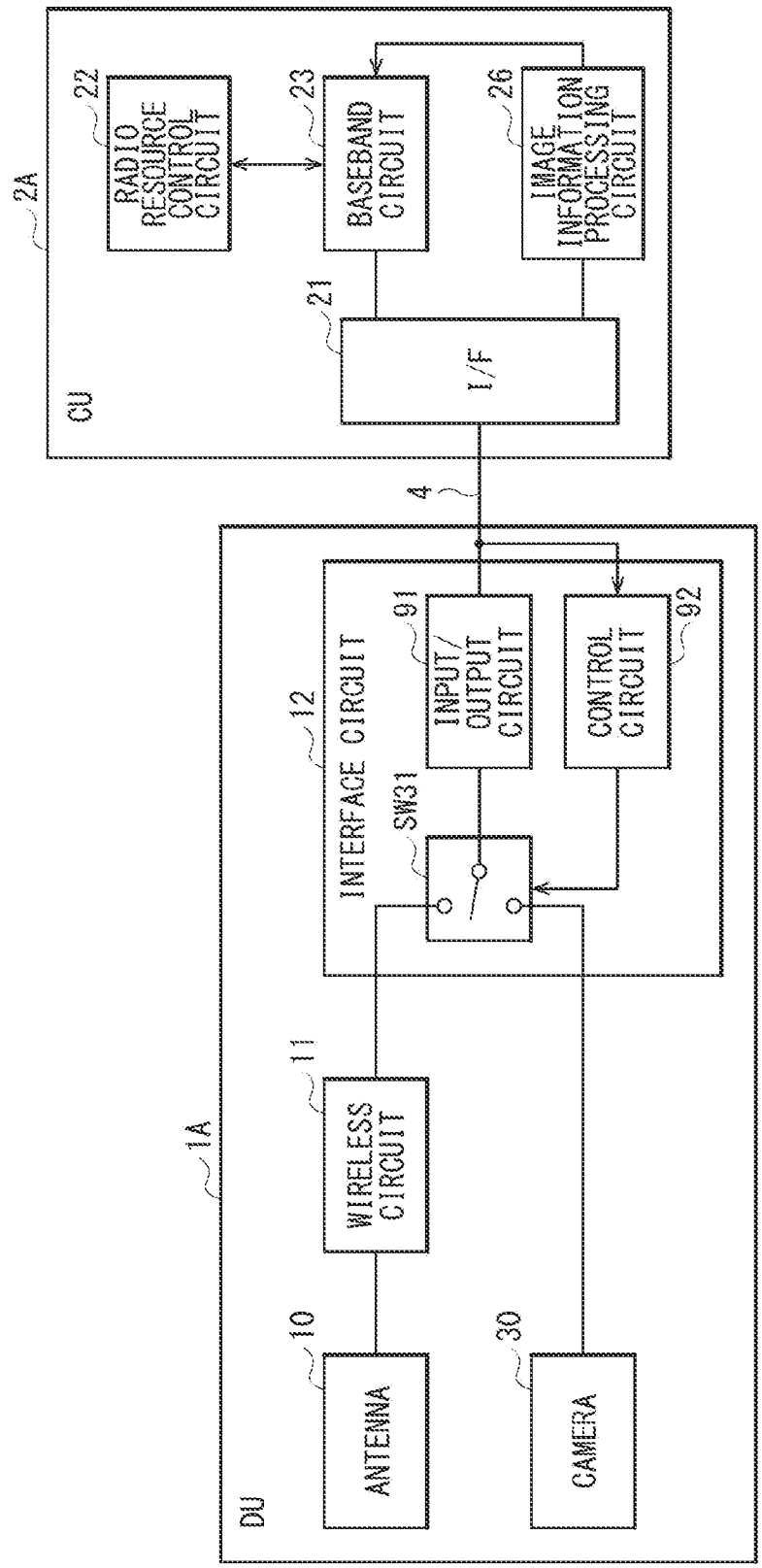
[FIG. 6]

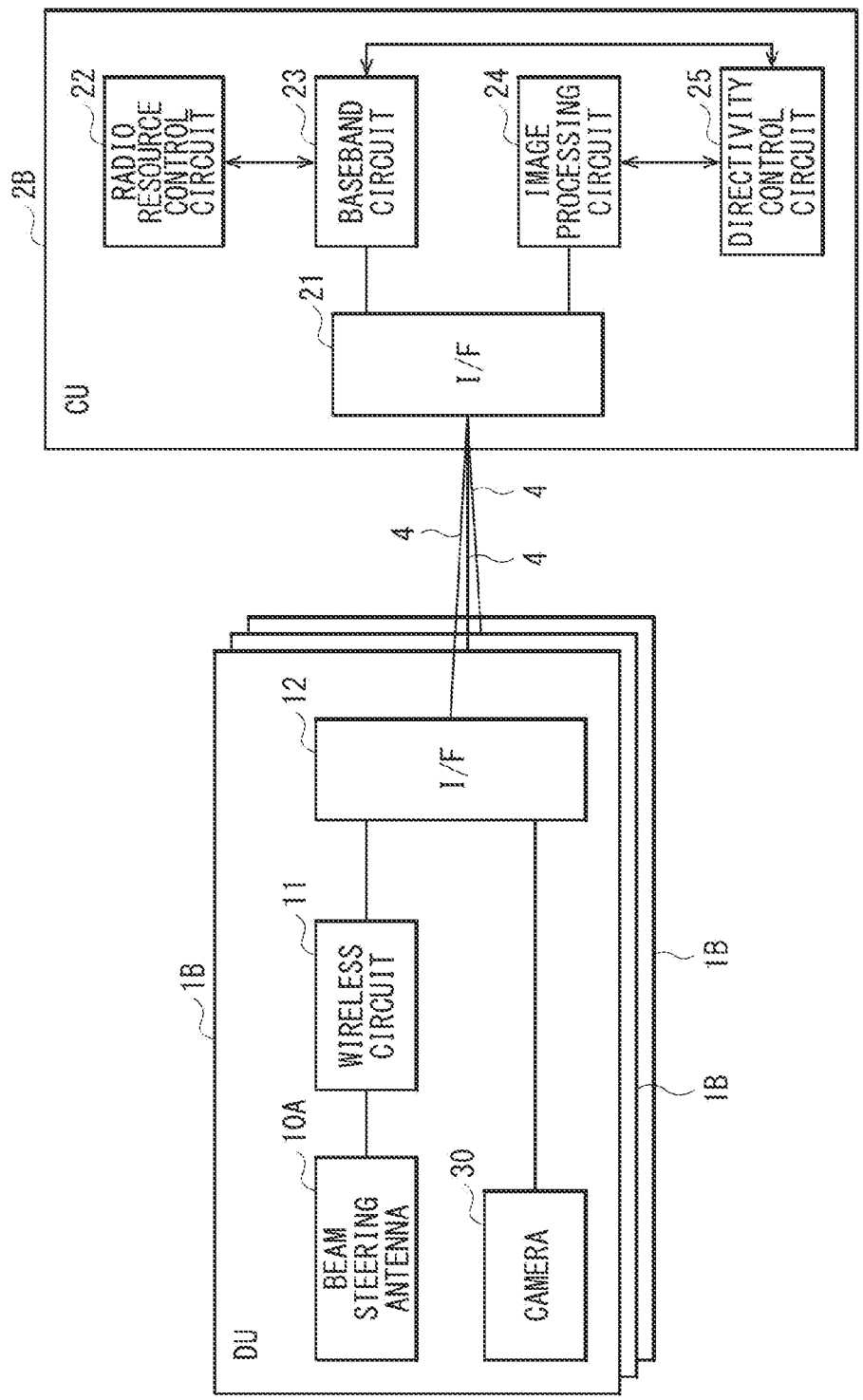
[FIG. 7]

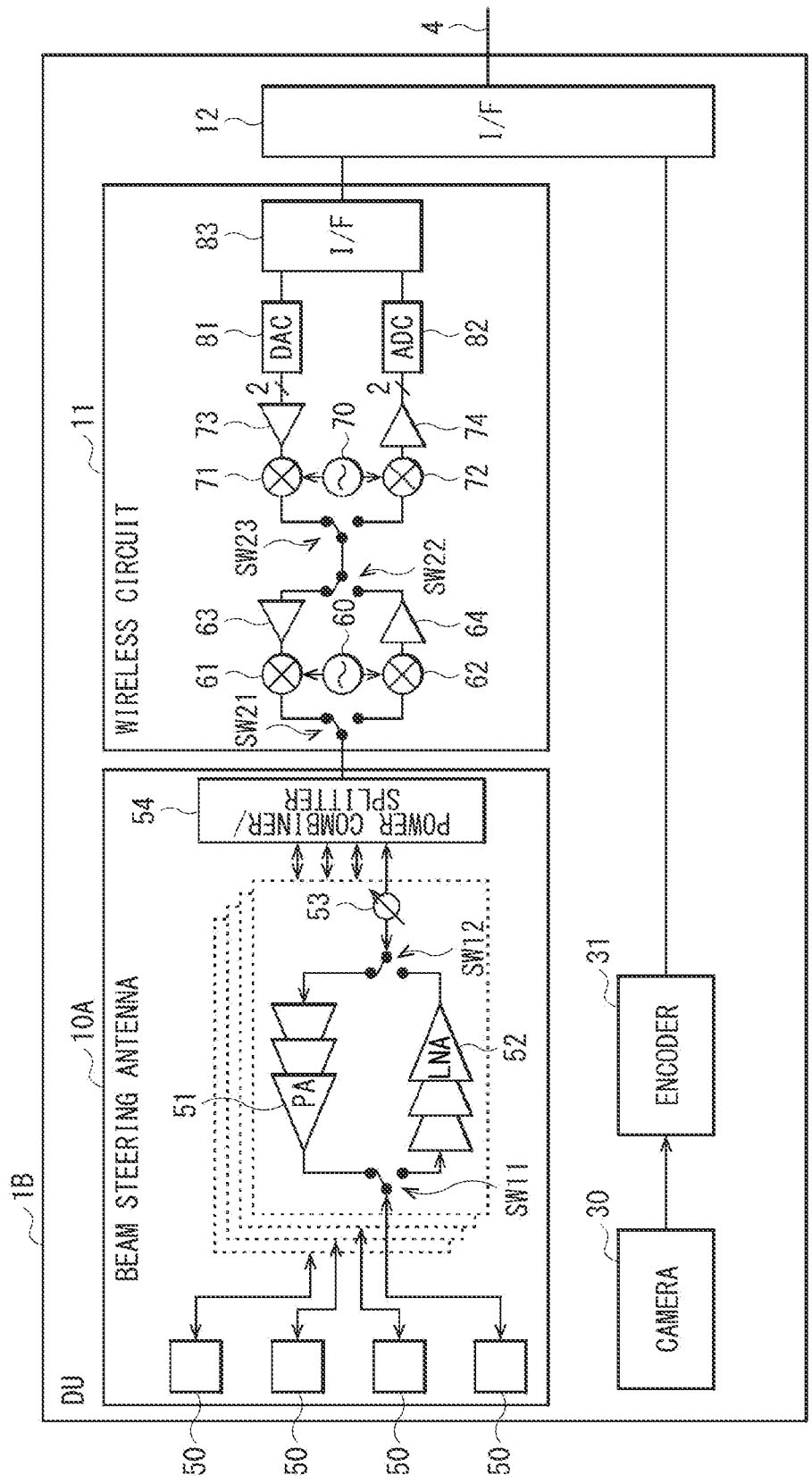
[FIG. 8]

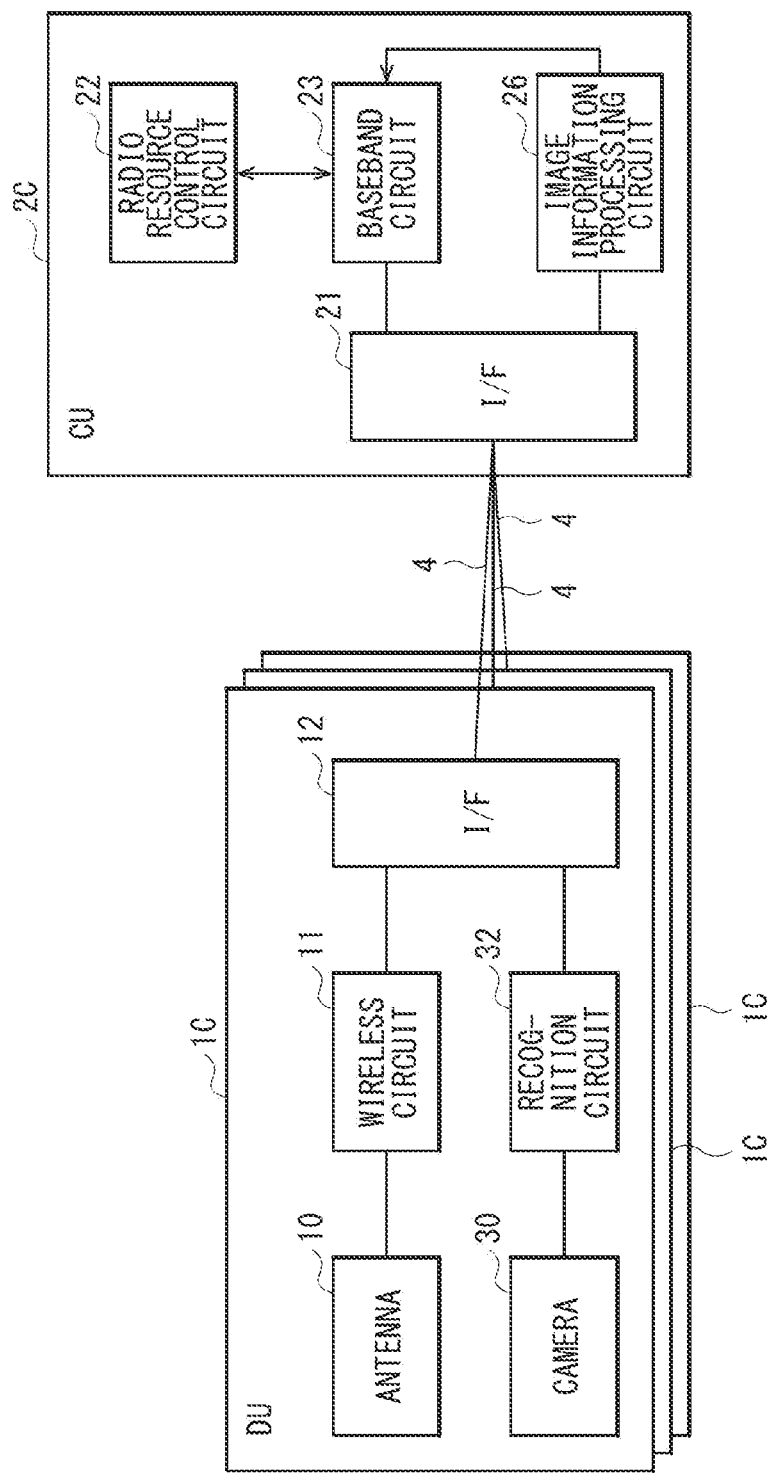
[FIG. 9]

WIRELESS SYSTEM

CROSS REFERENCE TO RELATED APPLICATIONS

This application is a U.S. National Phase of International Patent Application No. PCT/JP2022/000910 filed on Jan. 13, 2022, which claims priority benefit of Japanese Patent Application No. JP 2021-025442 filed in the Japan Patent Office on Feb. 19, 2021. Each of the above-referenced applications is hereby incorporated herein by reference in its entirety.

TECHNICAL FIELD

The present disclosure relates to a wireless system including a wireless circuit.

BACKGROUND ART

There is a wireless system having a configuration in which a wireless circuit that transmits and receives a wireless signal and a baseband circuit that performs signal processing of a wireless signal are divided from each other and are coupled to each other by a fiber optic line (for example, see PTL 1). Further, there is a wireless system including a plurality of distribution units (DU) that transmits and receives wireless signals, and a central unit (CU) that collects the wireless signals from the plurality of distribution units via fiber optic lines and performs signal processing (for example, see NPTL 1). In contrast, there is a system that collects image signals outputted from a plurality of cameras and performs a behavior analysis of a person (for example, see NPTL 2).

CITATION LIST

Patent Literature

PTL 1: Japanese Unexamined Patent Application Publication No. 2019-75814

Non-Patent Literature

NPTL 1: Umesh et al., "5G Radio Access Network Standardization Trends", NTT DOCOMO Technical Journal Vol. 25 No. 3, October 2017
NPTL 2: "700 AI cameras, a revolving venue where customers are interested", Nihon Keizai Shimbun electronic edition, Aug. 26, 2020

SUMMARY OF THE INVENTION

If wireless signals from a plurality of wireless circuits and image signals from a plurality of cameras are separately collected, and the wireless signals and the image signals are separately processed, an installation area and an installation cost are increased as a whole.

It is desirable to provide a wireless system that makes it possible to reduce an installation area and an installation cost.

A wireless system according to an embodiment of the present disclosure includes: one or a plurality of distributed units each including an antenna, a wireless circuit, and a camera, the wireless circuit transmitting and receiving a wireless signal via the antenna, the camera outputting an image signal; and a central unit that is line-coupled to each of the distributed units. The each of the distributed units transmits the wireless signal from the wireless circuit and image information based on the image signal outputted from the camera to the central unit using one line. The central unit includes a radio resource control circuit, a baseband circuit that performs signal processing on the wireless signal from the each of the distributed units on a basis of control performed by the radio resource control circuit, and a processing circuit that performs a process based on the image information from the each of the distributed units.

In the wireless system according to the embodiment of the present disclosure, the wireless signal from the wireless circuit and the image information based on the image signal outputted from the camera in each of the distributed units are transmitted to the central unit using one line. The central unit performs the process based on the wireless signal and the image information from the each of the distributed units.

BRIEF DESCRIPTION OF DRAWINGS

FIG. 1 is a configuration diagram illustrating an outline of a system according to a comparative example.
FIG. 2 is a block diagram schematically illustrating a configuration example of a wireless system according to a first embodiment of the present disclosure.
FIG. 3 is a configuration diagram schematically illustrating an example of a mode in which the wireless system according to the first embodiment is used.
FIG. 4 is a block diagram schematically illustrating a configuration example of an interface circuit of a distributed unit in the wireless system according to the first embodiment.
FIGS. 5A, 5B, and 5C are explanatory diagrams schematically illustrating an example of a superimposition method of a wireless signal and an image signal.
FIG. 6 is a configuration diagram schematically illustrating another example of the superimposition method of the wireless signal and the image signal.
FIG. 7 is a block diagram schematically illustrating a configuration example of a wireless system according to Modification example 1 of the first embodiment.
FIG. 8 is a block diagram schematically illustrating a detailed configuration example of a distributed unit in the wireless system according to Modification example 1 of the first embodiment.
FIG. 9 is a block diagram schematically illustrating a configuration example of a wireless system according to Modification example 2 of the first embodiment.

MODES FOR CARRYING OUT THE INVENTION

In the following, some embodiments of the present disclosure are described in detail with reference to the drawings. It is to be noted that description is given in the following order.

0. Comparative Example (FIG. 1)
1. First Embodiment
   1.1 Configuration and Operation (FIGS. 2, 3, 4, 5A, 5B, 5C, and 6)
   1.2 Modification Examples (FIGS. 7 to 9)
   1.3 Effects
2. Other Embodiments

0. Comparative Example

In wireless communication such as a cellular system, efforts to install a large number of antennas indoors and outdoors are actively being made in order to improve performance such as a communication rate, delay time, reliability, and the number of terminals coupled.

For example, NPTL 1 proposes a technique in which a central unit (CU) and a plurality of distributed units (DUs) each equipped with an antenna or the like are coupled to each other via fiber optic lines to configure a C-RAN (Centralized Radio Access Network) which is a base station device. In this technique, a plurality of antennas is disposed at different locations, and wireless signals thereof are collected in the central unit to perform signal processing, thereby enhancing an area-wide communication quality.

In addition, a technique is proposed in which a number of distributed units are installed indoors and outdoors to ensure a communication quality. In 5G (a fifth-generation mobile communication system), wide frequency bands including a millimeter wave frequency band, which is a frequency band 10 times high as compared with 4G (fourth-generation mobile communication system), are utilized, and services which utilize features such as high-speed, large capacity, low delay, and many connections are expected. However, by the nature of millimeter waves, the communication quality tends to deteriorate due to shielding and interference caused by walls and installations, especially indoors. Accordingly, it is possible to enhance the communication quality by dispersedly disposing the antennas and performing signal processing in the central unit.

Meanwhile, efforts to observe and analyze a realistic environment are actively being made by installing a large number of cameras. For example, NPTL 2 discloses a technique that analyzes behaviors of shoppers by installing hundreds of cameras in a shop. By doing so, information are gathered about what the shoppers take in their hands and which shelves they stop on, and improvement in sales is attempted by optimizing a sales floor.

In some cases, it is desired to collect wireless signals from a plurality of distributed units and image signals from a plurality of cameras.

FIG. 1 illustrates an outline of a system according to a comparative example.

FIG. 1 is a block diagram illustrating a method of collecting both the wireless signals and the image signals. The system according to the comparative example includes: a plurality of distributed units 101 that transmits and receives wireless signals; and a central unit 102 that collects the wireless signals from the plurality of distributed units 101 via lines 105 such as fiber optic lines, and performs signal processing on the wireless signals.

Each distributed unit 101 includes an antenna 110, a wireless circuit 111, and an OF (interface) circuit 112. The wireless circuit 111 transmits and receives the wireless signal via the antenna 110. The interface circuit 112 performs transmission of the signal between the distributed unit 101 and the central unit 102 via the line 105.

The central unit 102 includes an interface circuit 121, a radio resource control circuit 122, and a baseband circuit 123. The interface circuit 121 performs transmission of the signal between the distributed unit 101 and the central unit 102 via the line 105. The baseband circuit 123 performs signal processing on the wireless signals from the respective distributed units 101 on the basis of control performed by the radio resource control circuit 122.

Further, the system according to the comparative example includes: a plurality of camera modules 103; and an image aggregation device 104 that collects image signals from the plurality of camera modules 103 via lines 106 such as fiber optic lines, and performs signal processing on the image signals.

Each camera module 103 includes a camera 130 and an I/F circuit 131. The camera 130 captures an image of a subject and outputs an image signal. The I/F circuit 131 performs transmission of the signal between the camera module 103 and the image aggregation device 104 via the line 106.

The image aggregation device 104 includes an I/F circuit 141 and an image processing circuit 142. The I/F circuit 141 performs transmission of the signal between the camera module 103 and the image aggregation device 104 via the line 106. The image processing circuit 142 performs signal processing on the image signals from the respective camera modules 103.

In the system according to the comparative example illustrated in FIG. 1, in a case where wireless communication and image capturing are to be performed in a wide area, it is conceivable that the plurality of distributed units 101 and the plurality of camera modules 103 are densely installed over a wide area on a plane basis. For example, it is conceivable to install the distributed units 101 and camera modules 103 at 10-meter intervals. However, in the configuration of the system according to the comparative example illustrated in FIG. 1, the distributed units 101 are installed separately from the camera modules 103. This increases costs of facilities and installation, and an installation area. Further, for the wireless signals from the distributed units 101 and for the image signals from the camera modules 103, optical fibers or the like for the lines 105 and the lines 106 are laid separately. This also increases the costs of facilities and installation, and the installation area.

A reason why the distributed units 101 are densely placed is that higher-frequency radio waves are used to improve a data transmission rate and a communication capacity of a wireless communication line. For example, a millimeter wave such as 28 GHz. In a case of such a millimeter wave, a transmission distance is shorter than that in a case of a low frequency band, and the wave is easily shielded by a small object such as a moving human body due to its short wavelength. This indicates that there is a demand to control the wireless communication line in accordance with the time-varying propagation environment. Observation of the propagation environment is generally performed using an intensity of a signal or the like. However, transmission of the signal for observation consumes radio resources. Thus, for example, the signals for observation are discretely disposed on a time axis or a frequency axis. In such a case, it is difficult to predict propagation path variation due to movement of the human body, and it is difficult to adaptively control a wireless system.

1. First Embodiment 1.1 Configuration and Operation

FIG. 2 schematically illustrates a configuration example of a wireless system according to a first embodiment of the present disclosure.

The wireless system according to the first embodiment includes: one or a plurality of distributed units 1; and a central unit 2 that is line-coupled to each of the distributed units 1 via a line 4.

The line 4 is, for example, an electric cable line. Further, the line 4 may also be a fiber optic line. Further, the line 4 may also be a wireless line. Signals to be transmitted to the line 4 (e.g., a wireless signal and an image signal) may each be a digital signal.

Each distributed unit 1 includes an antenna 10, a wireless circuit 11, an interface circuit 12, and a camera 30.

The wireless circuit 11 transmits and receives the wireless signal via the antenna 10. The camera 30 captures an image of a subject and outputs the image signal. The interface circuit 12 performs transmission of the signals between the distributed unit 1 and the central unit 2 via the line 4. Each distributed unit 1 transmits the wireless signal (a wireless baseband signal) from the wireless circuit 11 and image information based on the image signal outputted from the camera 30 to the central unit using one line 4. Each distributed unit 1 transmits the image signal itself as the image information to the central unit, for example.

The central unit 2 collects the wireless signals and the image signals from the plurality of distributed units 1 via the lines 4, and performs signal processing on the wireless signals and the image signals. The central unit 2 includes an interface circuit 21, a radio resource control circuit 22, a baseband circuit 23, and an image processing circuit 24.

The image processing circuit 24 corresponds to a specific example of a "processing circuit" according to the technology of the present disclosure.

The baseband circuit 23 performs signal processing on the wireless signals from the respective distributed units 1 on the basis of control performed by the radio resource control circuit 22.

The image processing circuit 24 performs an image analysis process as a process based on the image signal serving as the image information from each distributed unit 1.

The radio resource control circuit 22 controls the wireless circuit 11 of each distributed unit 1 in such a manner as to enhance a quality of wireless communication, on the basis of the image signal serving as the image information transmitted from each distributed unit 1.

In the wireless system according the first embodiment, each distributed unit 1 includes the antenna 10 and the camera 30. This makes it possible to reduce, as compared with the configuration in which the distributed units 101 are installed separately from the camera modules 103 as in the system according to the comparative example illustrated in FIG. 1, the volume and the installation area of the distributed units 101 and the camera modules 103. In the wireless system according to the first embodiment, it is possible to transmit the image signal from the camera 30 and the wireless signal from the antenna 10 in each distributed unit 1 via one line 4, thereby reducing the costs of facilities and installation.

In addition, in the wireless system according to the first embodiment, the radio resource control circuit 22 is able to enhance the quality of the wireless line by referring to the image information based on the image signal from the camera 30 included in the distributed unit 1 and controlling the wireless circuit 11 of each of the plurality of distributed units 1. FIG. 3 schematically illustrates an example of a mode in which the wireless system according to the first embodiment is used.

As the mode in which the wireless system according to the first embodiment is used, for example, as illustrated in FIG. 3, the plurality of distributed units 1 may each be installed in corresponding one of a plurality of areas 301, 302, and 303 that differ from each other. The plurality of areas 301, 302, and 303 may each include a person 200 and a terminal 201 having a wireless communication function. The camera 30 of each distributed unit 1 is able to capture a time-varying motion of an object such as the person 200, the terminal 201, or the like. Accordingly, the radio resource control circuit 22 of the central unit 2 is able to adaptively control the entire wireless system by predicting a future position of the person 200, the terminal 201, or the like.

FIG. 4 schematically illustrates a configuration example of the interface circuit 12 of the distributed unit 1 in the wireless system according to the first embodiment.

As illustrated in FIG. 4, the interface circuit 12 includes, for example, a switch SW31, an input/output circuit 91, and a control circuit 92.

In each distributed unit 1, the wireless signal (the wireless baseband signal) and the image signal are superimposed on each other by the interface circuit 12 and transmitted to the central unit 2 via one line 4. It is possible to transmit the wireless signal and the image signal to the central unit 2 using the same physical interface by, for example, segmentalizing each of the wireless signal and the image signal into finite-length data and configuring a packet to which a header and data length information are individually added. In this case, the interface circuit 12 of the distributed unit 1 is able to distinguish, by seeing the header of the received packet, whether the packet is the wireless signal or the image signal.

Various types of the interface circuit 12 are conceivable. For example, there is given an MIPI interface that is standardized by the MIPI Alliance. Alternatively, it is also possible to use IEEE 802 Ethernet that is standardized by the IEEE.

FIGS. 5A, 5B, and 5C schematically illustrate an examples of a superimposition method of the wireless signal and the image signal. FIG. 6 schematically illustrates another example of the superimposition method of the wireless signal and the image signal.

For example, as illustrated in FIGS. 5A, 5B, and 5C, the interface circuit 12 superimposes the wireless signal and the image signal on one line 4 in a time-division manner, and outputs the wireless signal and the image signal that are superimposed on each other. FIG. 5A illustrates the wireless signal, FIG. 5B illustrates the image signal, and FIG. 5C illustrates an example in which the wireless signal and the image signal are superimposed on the line 4. The control circuit 92 controls which of the wireless signal and the image signal is to be outputted by the switch SW31. The input/output circuit 91 outputs the wireless signal or the image signal that has been selected by the switch SW31.

The interface circuit 12 is able, for example, to set a timing of outputting at least one of the wireless signal or the image signal to a predetermined time interval. Further, the interface circuit 12 may be able to change respective priorities of output timings of the wireless signal and the image signal. For example, the control circuit 92 may be configured to determine a time-interval for transmission in advance for the wireless signal, the image signal, or each of the both.

The control circuit 92 may perform switching between the wireless signal and the image signal by the switch SW31 in accordance with the respective priorities. It is possible to determine the priorities in accordance with a rate of change in an ambient environment captured by the camera 30. Alternatively, it is also possible to determine the priorities in accordance with a demanded quality of data to be transmitted in the wireless signal. The quality is referred to as Quality of Service (QoS) or the like, which includes, for example, a transmission rate, reliability, and delay time, and depends on an application using the wireless system. Such a demanded QoS is recognizable by the radio resource control circuit 22 or the like.

Accordingly, as illustrated in FIG. 6, prioritization of the wireless signal and the image signal is achievable by the radio resource control circuit 22 controlling the control circuit 92 in a distributed unit 1A. In the wireless system illustrated in FIG. 6, the radio resource control circuit 22 in a central unit 2A determines, for example, the QoS or the like, and outputs a control signal that controls the control circuit 92 in the distributed unit 1A to the control circuit 92 via the line 4.

1.2 Modification Examples

Modification Example 1

FIG. 7 schematically illustrates a configuration example of a wireless system according to Modification example 1 of the first embodiment.

The wireless system according to Modification example 1 includes: one or a plurality of distributed units 1B; and a central unit 2B that is line-coupled to each of the distributed units 1B via the line 4.

The distributed unit 1B may have a configuration substantially similar to that of the distributed unit 1 illustrated in FIG. 2, except that the distributed unit 1B includes, as the antenna 10, a beam steering antenna 10A that is able to change a directivity.

The central unit 2B may have a configuration substantially similar to that of the central unit 2 illustrated in FIG. 2, except that the central unit 2B includes a directivity control circuit 25. The directivity control circuit 25 controls the directivity of the beam steering antenna 10A of each distributed unit 1B on the basis of the image signal serving as the image information transmitted from each distributed unit 1B.

In the wireless system according to Modification example 1, the directivity control circuit 25 of the central unit 2B is able to control the directivity of the beam steering antenna 10A of each distributed unit 1B to direct toward a communication partner captured by the camera 30 in such a manner as to be directed to the communication partner. Alternatively, it is possible to detect motions of nearby persons and the like by using the camera 30, to recognize in advance that the nearby persons and the like are to enter between the beam steering antenna 10A and the communication partner and are to block radio waves, and to deal with it. In addition, in a case where there is a plurality of communication partners, the plurality of distributed units 1B is able to cooperatively control the directivities of the respective beam steering antennas 10A in such a manner as to make it possible to reduce interference as a whole. This makes it possible to enhance the quality of the communication line and to effectively use radio resources.

FIG. 8 schematically illustrates a detailed configuration example of a distributed unit 1B in the wireless system according to Modification example 1 of the first embodiment.

The distributed unit 1B includes the beam steering antenna 10A, the wireless circuit 11, the interface circuit 12, the camera 30, and an encoder 31.

The beam steering antenna 10A includes a plurality of (for example, four) patch antennas 50, wireless circuit units respectively provided correspondingly to the plurality of patch antennas 50, and a power combiner (combining circuit)/splitter (distribution circuit) 54. The wireless circuit unit includes a PA (power amplifier) 51, a LNA (low noise amplifier) 52, a phase shifter 53, and switches SW11 and SW12. The switches SW11 and SW12 each perform switching between reception and transmission.

The wireless circuit 11 includes a local oscillator 60, a mixer 61, a mixer 62, an amplifier 63, an amplifier 64, a local oscillator 70, a mixer 71, a mixer 72, an amplifier 73, and an amplifier 74. Further, the wireless circuit 11 includes a DAC (digital-to-analog converter) 81, an ADC (analog-to-digital converter) 82, an OF (interface) circuit 83, and switches SW21, SW22, and SW23. The switches SW21, SW22, and SW23 each perform switching between reception and transmission.

The beam steering antenna 10A is a phased array antenna including the plurality of patch antennas 50. The phase shifter 53 is coupled to each patch antenna 50 via the PA 51 and the LNA 52. The signals from the plurality of patch antennas 50 are combined in the power combiner/splitter 54. The phase shifter 53 of each patch antenna 50 sets a phase of the signal of each patch antenna 50. Thus, the combined signal of the plurality of patch antennas 50 has the directivity. Accordingly, it is possible to control the directivity of the beam steering antenna 10A by controlling a phase shift quantity of the phase shifter 53.

Upon reception, the signal from the beam steering antenna 10A is frequency-converted by the local oscillator 60 and the mixer 62, and is amplified by the amplifier 64. Further, the local oscillator 70 and the mixer 72 convert the signal into a wireless baseband signal by frequency conversion, and the amplifier 74 amplifies the wireless baseband signal. The amplified wireless baseband signal is converted into a digital signal by the ADC 82, and is inputted to the interface circuit 83.

Upon transmission, the DAC 81 converts the digital signal into an analog signal. The analog signal is amplified by the amplifier 73, and is frequency-converted by the local oscillator 70 and the mixer 71. In addition, the analog signal is amplified by the amplifier 63, is frequency-converted by the local oscillator 60 and the mixer 61, and is inputted to the beam steering antenna 10A.

Meanwhile, the image signal from the camera 30 is subjected to a process such as compression by the encoder 31, and is thereafter inputted to the interface circuit 12.

Modification Example 2

FIG. 9 schematically illustrates a configuration example of a wireless system according to Modification example 2 of the first embodiment.

The wireless system according to Modification example 2 includes: one or a plurality of distributed units 1C; and a central unit 2C that is line-coupled to each of the distributed units 1C via the line 4.

The distributed unit 1C may have a configuration substantially similar to that of the distributed unit 1 illustrated in FIG. 2, except that the distributed unit 1C includes a recognition circuit 32. The recognition circuit 32 performs a recognition process of an image on the image signal outputted from the camera 30, and outputs, as the image information, information indicating a result of the recognition process performed by the recognition circuit 32.

The central unit 2C may have a configuration substantially similar to that of the central unit 2 illustrated in FIG. 2, except that the central unit 2C includes an image information processing circuit 26 instead of the image processing circuit 24.

The image processing circuit 24 corresponds to a specific example of a "processing circuit" according to the technology of the present disclosure.

In the wireless system according to Modification example 2, the recognition circuit 32 in each distributed unit 1C performs the image recognition process on the image signal outputted from the camera 30, and the result thereof is transmitted to the central unit 2C through the line 4. Image recognition information serving as the image information collected in the central unit 2C is processed in the image information processing circuit 26. The radio resource control circuit 22 is able to control the wireless system on the basis of a result of the process performed by the image information processing circuit 26.

1.4 Effects

As described above, according to the wireless system of the first embodiment, the wireless signal from the wireless circuit 11 and the image information based on the image signal outputted from the camera 30 in each distributed unit 1 are transmitted to the central unit 2 using one line 4. The central unit 2 performs the process based on the wireless signal and the image information from each distributed unit 1. This makes it possible to reduce the installation area and the installation cost.

According to the wireless system of the first embodiment, it is possible to reduce the volume and the installation area of the distributed unit 101 and the camera module 103 in the comparative example illustrated in FIG. 1. Further, it is possible to transmit the image signal from the camera 30 and the wireless signal from the antenna 10 in each distributed unit 1 via one line 4, and to reduce the costs of facilities and installation.

According to the wireless system of the first embodiment, it is possible to control the plurality of distributed units 1 using the image captured by the camera 30. For example, in a case where a certain camera 30 captures many communication partners, the radio resource control circuit 22 of the central unit 2 controls the baseband circuit 23 and the wireless circuit 11 of the distributed unit 1 on which the relevant camera 30 is mounted, thereby increasing a bandwidth and increasing a capacity of the wireless circuit 11 achievable by each distributed unit 1. Alternatively, in a case where the camera 30 captures no communication partner, the radio resource control circuit 22 is able to block the wireless line of the distributed unit 1 on which the relevant camera 30 is mounted. In addition, in a case where the camera 30 captures a human body or an object that blocks radio waves, control is performed in such a manner as not to emit radio waves from the antenna 10 in the same housing but to emit radio waves from another distributed unit 1, which makes it possible to not only enhance the quality of wireless communication but also to suppress interference to another distributed unit 1 by suppressing the emission of unwanted radio waves. Those described above bring about increased utilization efficiency of area-wide radio resources.

Further, in a case where the beam steering antenna 10A (FIG. 7) which is able to control the directivity as the antenna 10, the directivity control circuit 25 of the central unit 2B is able to direct the directivity of the beam steering antenna 10A toward a communication partner captured by the camera 30 in such a manner as to be directed to the communication partner. Alternatively, it is possible to detect motions of nearby persons and the like by using the camera 30, to recognize in advance that the nearby persons and the like are to enter between the beam steering antenna 10A and the communication partner and are to block radio waves, and to deal with it. In addition, in a case where there is a plurality of communication partners, the plurality of distributed units 1B is able to cooperatively control the directivities of the respective beam steering antennas 10A in such a manner as to make it possible to reduce interference as a whole. This makes it possible to enhance the quality of the communication line and to effectively use radio resources.

It should be appreciated that the effects described herein are mere examples, and are not limited to those described herein. The disclosure may further include any effects other than those described herein. This applies similarly to effects of other embodiments below.

2. Other Embodiments

The technology according to the present disclosure is not limited to the description of the foregoing embodiments, and may be modified in a variety of ways.

For example, the present technology may have the following configurations.

According to the present technology having the following configurations, the wireless signal from the wireless circuit and the image information based on the image signal outputted from the camera in each distributed unit are transmitted to the central unit using one line. The central unit performs a process based on the wireless signal and the image information from each distributed unit. This makes it possible to reduce the installation area and the installation cost.

(1)

A wireless system including:

one or a plurality of distributed units each including an antenna, a wireless circuit, and a camera, the wireless circuit transmitting and receiving a wireless signal via the antenna, the camera outputting an image signal; and a central unit that is line-coupled to each of the distributed units, in which the each of the distributed units transmits the wireless signal from the wireless circuit and image information based on the image signal outputted from the camera to the central unit using one line, and the central unit includes
a radio resource control circuit,
a baseband circuit that performs signal processing on the wireless signal from the each of the distributed units on a basis of control performed by the radio resource control circuit, and
a processing circuit that performs a process based on the image information from the each of the distributed units.

(2)

The wireless system according to (1), in which the radio resource control circuit controls the wireless circuit of the each of the distributed units, on a basis of the image information transmitted from the each of the distributed units, in such a manner as to enhance a quality of wireless communication.

(3)

The wireless system according to (1) or (2), in which
the antenna includes a beam steering antenna configured to change a directivity, and
the central unit further includes a directivity control circuit that controls the directivity of the beam steering antenna of the each of the distributed units on a basis of the image information transmitted from the each of the distributed units.

(4)

The wireless system according to any one of (1) to (3), in which the each of the distributed units further includes a recognition circuit that performs a recognition process of an image on the image signal outputted from the camera, and outputs, as the image information, information indicating a result of the recognition process performed by the recognition circuit.

(5)

The wireless system according to any one of (1) to (4), in which the wireless signal and the image information to be transmitted to the line each include a digital signal.

(6)

The wireless system according to any one of (1) to (5), in which the line includes an electric cable line.

(7)

The wireless system according to any one of (1) to (5), in which the line includes a fiber optic line.

(8)

The wireless system according to any one of (1) to (5), in which the line includes a wireless line.

(9)

The wireless system according to any one of (1) to (8), in which the each of the distributed units further includes an interface circuit that superimposes the wireless signal and the image information on one line in a time-division manner, and outputs the wireless signal and the image information that are superimposed on each other.

(10)

The wireless system according to (9), in which the interface circuit is configured to change respective priorities of output timings of the wireless signal and the image information.

(11)

The wireless system according to (9), in which the interface circuit is configured to set a timing of outputting at least one of the wireless signal or the image signal to a predetermined time interval.

This application claims the benefit of Japanese Priority Patent Application JP2021-25442 filed with the Japan Patent Office on Feb. 19, 2021, the entire contents of which are incorporated herein by reference.

It should be understood by those skilled in the art that various modifications, combinations, sub-combinations, and alterations may occur depending on design requirements and other factors insofar as they are within the scope of the appended claims or the equivalents thereof.

The invention claimed is:

1. A wireless system comprising:
one or a plurality of distributed units each including an antenna, a wireless circuit, and a camera, the wireless circuit transmitting and receiving a wireless signal via the antenna, the camera outputting an image signal; and
a central unit that is line-coupled to each of the distributed units, wherein
the each of the distributed units transmits the wireless signal from the wireless circuit and image information based on the image signal outputted from the camera to the central unit using one line, and
the central unit includes
a radio resource control circuit,
a baseband circuit that performs signal processing on the wireless signal from the each of the distributed units on a basis of control performed by the radio resource control circuit, and
a processing circuit that performs a process based on the image information from the each of the distributed units.

2. The wireless system according to claim 1, wherein the radio resource control circuit controls the wireless circuit of the each of the distributed units, on a basis of the image information transmitted from the each of the distributed units, in such a manner as to enhance a quality of wireless communication.

3. The wireless system according to claim 1, wherein
the antenna includes a beam steering antenna configured to change a directivity, and
the central unit further includes a directivity control circuit that controls the directivity of the beam steering antenna of the each of the distributed units on a basis of the image information transmitted from the each of the distributed units.

4. The wireless system according to claim 1, wherein the each of the distributed units further includes a recognition circuit that performs a recognition process of an image on the image signal outputted from the camera, and outputs, as the image information, information indicating a result of the recognition process performed by the recognition circuit.

5. The wireless system according to claim 1, wherein the wireless signal and the image information to be transmitted to the line each comprise a digital signal.

6. The wireless system according to claim 1, wherein the line comprises an electric cable line.

7. The wireless system according to claim 1, wherein the line comprises a fiber optic line.

8. The wireless system according to claim 1, wherein the line comprises a wireless line.

9. The wireless system according to claim 1, wherein the each of the distributed units further includes an interface circuit that superimposes the wireless signal and the image information on one line in a time-division manner, and outputs the wireless signal and the image information that are superimposed on each other.

10. The wireless system according to claim 9, wherein the interface circuit is configured to change respective priorities of output timings of the wireless signal and the image information.

11. The wireless system according to claim 9, wherein the interface circuit is configured to set a timing of outputting at least one of the wireless signal or the image signal to a predetermined time interval.

* * * * *